United States Patent [19]

Savoly et al.

[11] Patent Number: 5,714,001
[45] Date of Patent: Feb. 3, 1998

[54] FOAMING AGENT COMPOSITION AND PROCESS

[75] Inventors: Arpad Savoly, Martinsville; Dawn P. Elko, Flemington, both of N.J.

[73] Assignee: Geo Specialty Chemicals, Inc., Cleveland, Ohio

[21] Appl. No.: 558,040

[22] Filed: Nov. 13, 1995

Related U.S. Application Data

[63] Continuation of Ser. No. 166,122, Dec. 13, 1993, abandoned.

[51] Int. Cl.⁶ ........................................ C04B 11/024
[52] U.S. Cl. .................... 106/678; 156/43; 106/680; 106/781; 252/307
[58] Field of Search ........................ 156/39, 43; 106/678, 106/680, 725, 781; 252/307, 308, 353

[56] References Cited

U.S. PATENT DOCUMENTS

| | | | |
|---|---|---|---|
| 2,985,219 | 5/1961 | Summerfield | 156/43 |
| 3,429,724 | 2/1969 | Keenum et al. | 106/89 |
| 3,782,983 | 1/1974 | Komor | 106/88 |
| 4,046,582 | 9/1977 | Kawamura et al. | 106/88 |
| 4,132,678 | 1/1979 | Iijima et al. | 252/545 |
| 4,156,615 | 5/1979 | Cukier | 106/111 |
| 4,210,764 | 7/1980 | Yang et al. | 568/618 |
| 4,223,164 | 9/1980 | Yang et al. | 568/618 |
| 4,239,917 | 12/1980 | Yang et al. | 568/618 |
| 4,453,022 | 6/1984 | McCain et al. | 568/618 |
| 4,618,370 | 10/1986 | Green et al. | 106/111 |
| 4,676,835 | 1/1987 | Green et al. | 106/111 |
| 4,678,515 | 7/1987 | Green et al. | 106/111 |
| 4,731,201 | 3/1988 | Robbins et al. | 252/551 |
| 4,962,237 | 10/1990 | Laycock et al. | 568/618 |
| 5,085,929 | 2/1992 | Bruce et al. | 428/309 |
| 5,133,409 | 7/1992 | Bour et al. | 166/293 |
| 5,158,612 | 10/1992 | Savoly et al. | 106/678 |
| 5,240,639 | 8/1993 | Diez et al. | 252/307 |
| 5,466,393 | 11/1995 | Diez et al. | 156/39 |

FOREIGN PATENT DOCUMENTS

| | | |
|---|---|---|
| 1085880 | 10/1977 | Canada. |
| 2196334 | 10/1986 | United Kingdom. |

*Primary Examiner*—Steven D. Maki
*Attorney, Agent, or Firm*—Thompson Hine & Flory LLP

[57] ABSTRACT

Surfactants containing a mixture of alkyl sulfate and alkyl ether sulfate in specific ratios are provided. Preferred compositions are blends of alkyl sulfate with narrow range alkoxylated alcohols are sulfonated. These compositions are used as improved foaming agent compositions and exhibit desirable foaming characteristics for use in the manufacture of gypsum board and concrete and in oil field applications.

34 Claims, No Drawings

FOAMING AGENT COMPOSITION AND PROCESS

This application is a continuation of application Ser. No. 08/166,122 filed on Dec. 13, 1993 now abandoned.

BACKGROUND OF THE INVENTION

1. Field of the Invention

This invention relates to compositions useful for generating foam and more particularly to compositions for use in foaming agents during, for example, the manufacture of gypsum board or concrete, and to processes for using such compositions.

2. Discussion of Related Art

Generally, gypsum board consists of a core of set gypsum surfaced with paper or other fibrous material suitable to receive a coating such as paint. It is common to manufacture gypsum board by placing an aqueous core slurry ("slurry") composed predominantly of calcined gypsum between two sheets of paper thereby forming a board. The resultant core is allowed to set or harden by rehydration of the calcined gypsum, usually followed by heating the gypsum board in a dryer so as to drive away any excess water.

It is common practice to introduce air bubbles into the slurry to reduce its density and to reduce the amount of water necessary to produce a workable slurry. This is normally achieved by the addition of a foaming agent, comprised of an active ingredient along with other additives, during the formation of the slurry or by adding externally-generated foam to the slurry. The externally-generated foam is normally produced by incorporating air or other gas into an aqueous solution of a foaming agent; the resulting mixture is then mixed with the slurry.

Foaming agents generally contain as active ingredients one or more salts of alkyl ether sulfates. Known salts of alkyl ether sulfates employed in foaming agents, such as those disclosed in Cukier U.S. Pat. No. 4,156,615, Green et al. U.S. Pat. Nos. 4,618,370, 4,676,835 and 4,678,515, and UK published patent application GB 2 196 334 have the general formula I:

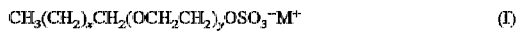

where x and y represent integers which may be the same or different and may have non-integral average values in any practical sample size because of the method of synthesis, and $M^+$ represents either sodium or ammonium ion.

In a practical mixture of such foaming agents as commercially used, the distribution of molecules having particular numbers of ethoxy units, as represented by y in formula I, can be represented in the form of a generally bell-shaped curve in which the number or fraction of molecules containing a particular number of ethoxy unit is plotted versus the number of such ethoxy units, starting at y=0 (representing unethoxylated starting material). The broader the curve, the more evenly distributed are values of y. The narrower the curve, the more narrowly distributed are values of y. Methods are available for separating compounds of formula I having specified values of x and y from compounds having other values of x and/or y, but these methods are tedious and expensive and are not believed to be used in industrial practice.

U.S. Pat. No. 5,158,612 (Savoly et al.) discloses practicable compositions in which the individual molecules in the composition conform to formula I or a similar formula but the distribution of values of y in the mixture is adjusted so that not more than 20% are molecules having y=0 and at least 45% have y=2 or 3, which yields a composition more favorable for foaming than in the mixtures available theretofore.

U.S. Pat. No. 5,240,639 (Diez et al.) discloses foaming agent comprised of a mixture of alkyl sulfates and alkyl ether sulfates of the formula $R_x(OCH_2CH_2)_yOSO_3M$ wherein $R_x$ represents linear and/or branched chain hydrocarbons having an average of x carbon atoms where at least about 80% of x is between about 8 and 10; y represents the average number of moles of ethylene oxide per mole of hydrocarbon $R_x$ and is between about 0.4 and 1.3; M represents a cation capable of producing a water-soluble surfactant; and the amount of surfactant in the mixture having y=0 plus y=1 (the sum of the alkyl sulfate and the alkyl mono-ether sulfate) is between about 44 and 85 weight percent of the foaming agent and the amount of surfactant having y=0 (alkyl sulfate) is from about 25 to 85 weight percent of the foaming agent. This blend of surfactants is described as having improved foaming properties.

SUMMARY OF THE INVENTION

This invention relates to a surfactant composition comprised of a mixture of molecules, each of which conforms to the general formula II:

where R is a fatty alkyl group, y is an integer for a pure compound and a non-integer (i.e. an average value) for mixtures of compounds having varying values of y, R' represents a hydrogen or a lower alkyl group, and M is chosen from the group consisting of sodium and ammonium ions. Unalkoxylated compounds are represented by y=0. In compositions according to the invention, the weight ratio of compounds having y=0 to the sum of the weights of compounds having y=2 or 3 is at least 12:1 (preferably at least 21:1, more preferably from about 25:1 to about 99:1 and most preferably from about 30:1 to about 60:1). The average value of y may vary and preferably ranges from 0.001 to 0.4. R is preferably $CH_3(CH_2)_x$— wherein x has an average value ranging from 5 to 11 with preferred average values of x ranging from 7 to 9.

In particularly preferred embodiments, the weight ratio of the sum of the weights of compounds having y=2 or 3 to compounds having y=1 is at least 2.1:1 more preferably at least 2.3:1 and most preferably from about 3.0:1 to about 6.0:1 (e.g. about 4.4:1). These particularly preferred compositions can be prepared by sulfation of a mixture of certain selected commercially available products generally described as "narrow range alkoxylated alcohols" with an unalkoxylated alcohol to produce mixtures of compounds extraordinarily valuable as foaming agents.

Another embodiment of the invention is a foaming agent, in which the alkyl sulfate and alkyl ether sulfate mixtures according to the present invention as already described above constitute a major amount by weight (i.e. as the component present in the greatest amount by weight, e.g. between 40% and 60% by weight of the total foaming agent composition); the other components of the foaming agent composition being a hydrotrope, water, and optionally, a chelating or sequestering agent for divalent and higher valent metal ions. The latter constituent is particularly valuable when the foaming agent is made up with hard water and the chelating agent effectively sequesters calcium and magnesium ions. A hydrotrope comprises a minor amount by weight of the foaming agent composition (i.e. it is not the component present in the greatest amount by weight, e.g. from about 5% to 20% by weight of a foaming agent composition according to the invention); the hydrotrope is preferably selected from the group consisting of methanol, ethanol, isopropanol, ethylene glycol, propylene glycols, polyethylene and polypropylene glycols, monoalkyl ethers of ethylene glycol, alkyl polyglucosides, and the like, and mixtures thereof. The balance of the foaming agent composition is typically water.

Further embodiments of the invention are methods of using the surfactant compositions and/or foaming agent compositions described above in the manufacture of gypsum board. Thus, this invention also relates to a method of using a composition of this invention comprising preparing a foamed gypsum composition comprised of a surfactant composition of this invention in an amount effective to prepare a foamed composition and depositing said foamed composition onto an essentially planar surface defined by an essentially impenetrable barrier (preferably a non-woven cellulosic web, e.g. wallboard paper stock). The resulting layer of foamed gypsum composition is then typically covered with a second essentially impenetrable barrier to produce a double-sided wallboard.

Thus, this invention also relates to a method of using a surfactant composition of this invention in the manufacture of gypsum board, said method comprising:

preparing a foamed gypsum composition comprised of a surfactant composition of this invention in an amount effective to prepare a foamed composition, depositing said foamed composition onto a first essentially planar surface defined by an essentially impenetrable barrier, said depositing being effective to present an exposed surface of said foamed gypsum composition, covering said exposed surface of said foamed gypsum with a second essentially planar surface defined by an essentially impenetrable barrier, and maintaining said first and second essentially planar surfaces in a fixed relation (e.g. by restricting the flow of the foamed gypsum composition from between said essentially planar surfaces) at least until said foamed gypsum composition has set from a plastic state to a hardened state.

Use of the surfactant compositions of this invention in foaming agent compositions in the manufacture of cement or concrete and in oil well applications are also contemplated as other embodiments of the invention.

In this description, except in the working examples and claims and wherever expressly indicated to the contrary, all numerical specifications of amounts of materials or conditions of reaction or use are to be understood as modified by the term "about" in describing the broadest scope of the invention. Practice of the invention within the exact numerical limits given is generally preferred.

DETAILED DESCRIPTION OF THE INVENTION

The surfactant composition of this invention is comprised of a mixture of molecules in specific ratios. These compositions can be prepared in a variety of ways. A preferred method of practicing this invention consists of blending a specific alcohol sulfate with a specific alcohol ether sulfate to achieve the desired molecular weight and oxyethylene distribution previously disclosed. For example, when an octyl-decyl alcohol sulfate (R is from 8 to 10, molecular weight of R is from about 113 to 142), is mixed in such a proportion with an alkoxylated foaming agent of the type disclosed by Cukier (U.S. Pat. No. 4,156,615, Sample A), to achieve a distribution of oxyethylene oligomers where the weight ratio of alkyl sulfate to the sum of the alkyl di-ether sulfate and alkyl tri-ether sulfate is at least 12:1, the resulting wallboard has advantageous properties. The use of a predominant amount of a foaming agent which is a relatively poor gypsum air entrainer (octyl-decyl alcohol sulfate) with a relatively small amount of a foaming agent which is a relatively good gypsum air entrained (the type disclosed by Cukier, U.S. Pat. No. 4,156,615) yields new foaming agents within the scope of this invention. These new foaming agents are superior foaming agents for use in gypsum wallboard formation.

There are other ways of practicing the invention, such as blending fatty alcohols with alkoxylated fatty alcohols, followed by sulfation of the blend with a sulfating agent such as $SO_3$, and then neutralization with a base, such as $NH_4OH$. There is also the direct method of practicing the invention, wherein about one mole of a linear and/or branched alcohol (preferably having at least 80 percent by weight, most preferably 98 percent by weight of 8 to 10 carbon atoms (where the molecular weight of R is from about 113 to 141)) is reacted with about 0.01 to just less than 0.4 moles, and most preferably 0.05 to 0.3 moles of ethylene oxide in the presence of a catalyst to incorporate the oxyethylene groups. Typical examples of such catalysts include NaOH and KOH. Once the oxyethylene groups are incorporated, the alkoxylated fatty alcohols are then conventionally sulfated with a sulfating agent such as $SO_3$, and then conventionally neutralized with a base such as $NH_4OH$, to obtain directly the inventive foaming agent. The foaming agent is neutralized with a base, e.g. $NH_4OH$ to produce a water soluble surfactant. Typical examples of cations producing a water soluble surfactant include sodium, potassium, magnesium, ammonium, and organic derivatives thereof, such as triethanolamine and the like. Presently preferred cations are ammonium and organic derivatives thereof.

The surfactant compositions of this invention are preferably prepared from narrow range alkoxylated alcohols. Narrow range alkoxylated alcohols are characterized by a narrow distribution of values of y, i.e., a higher percentage of compounds having values of y near preferred values of y. (Percentages are specified herein by weight unless otherwise stated.) Specifically, with increasing preference in the order stated for each value of y, with independent preference for each stated value of y, and with percentages referred to the total amount of molecules conforming to formula II in the foaming agent composition according to the invention: not more than 20%, 17%, 11%, or 9% of the molecules have a value of y=0; and at least 45%, 46%, 47%, 48%, 49%, 50%, 51%, or 52% of the molecules have y=2 or 3.

Reaction products of alcohols and alkylene oxides which have a narrow or peaked distribution of alkoxy units ("narrow range alkoxylated alcohols") that are suitable as starting materials for making these compositions according to the invention are known. See for example, McCain et al. U.S. Pat. No. 4,453,022, Yang et al. U.S. Pat. No. 4,210,764, Yang et al. U.S. Pat. No. 4,223,164, and Yang et al. U.S. Pat. No. 4,239,917.

It has been found that sulfating suitable narrow range alkoxylated alcohol mixtures yields a composition of mixed compounds, each individually characterized by formula II, which exhibit desirable foaming characteristics despite the presence of some molecules having less preferred numbers of alkoxy units, including the highly unpreferred number zero. Separation of preferred compounds from less preferred compounds is not required to obtain superior foaming agents.

It is preferred, with increasing preference in the order given, that compositions according to the invention contain at least 10, 12, 15, or 17% by weight, referred to the total content of molecules conforming to formula II, of molecules in which y in formula II has each of at least two different integral values.

In compositions according to the invention, x in formula II has values ranging from 5 to 11 with preferred values ranging from 7 to 9 and with a preferred average value for x being 8; R' in formula II is preferably ethyleneoxy or propyleneoxy, most preferably ethyleneoxy; y in formula II has values of less than 0.4, preferred values ranging from 0.001 to 0.3, more preferred values ranging from 0.01 to 0.2, still more preferred values from 0.05 to 0.1. $M^+$ in formula II represents either sodium or ammonium ions, with ammonium ions being preferred.

The foaming agents of this invention are particularly useful in producing gypsum board and are typically used in amounts ranging from about 0.03 to 0.01 parts by weight per 100 parts by weight of gypsum. In the manufacture of gypsum particle board according to this invention, foaming agent compositions of the present invention as described above are normally added to a foam generator in the form of an aqueous solution in which the concentration of the surfactant composition in aqueous solution is preferably in the range of 0.01% to 5%, preferably from 0.25% to 2%. The resultant foam is then mixed with the aqueous core slurry in water. The resultant foam preferably comprises 2% to 20% by weight of the aqueous core slurry for the particle board.

The invention also relates to an improved gypsum board and particularly to a gypsum board having an decreased density, but which have acceptable structural strength, e.g. compressive strength. Such strength will allow the board to maintain its structural integrity in the vicinity of fasteners, e.g. nails, screws, etc., that may be driven into the board.

Typically, in the manufacture of gypsum board a pregenerated foam is added to the board core slurry mix to decrease the weight of the gypsum board. This foam is generated from a mixture of a liquid foaming agent, air and water in a suitable foam generating apparatus. The foamed gypsum slurry is then deposited upon a moving paper substrate which, itself, is supported on a long moving belt. A second paper substrate is then applied on top of the slurry to constitute the second face of the gypsum board and the sandwich passes through a forming station which determines the width and thickness of the gypsum board. In such a continuous operation the gypsum slurry begins to set immediately after forming. When sufficient setting has occurred the board is cut into commercially acceptable lengths, typically eight feet, and then passed into a board dryer. Thereafter the board is trimmed to length, bundled in pairs and stored prior to sale.

The foaming agent in this invention may also be used for other foaming applications, for example, firefighting foams.

Further appreciation of the present invention may be had from considering the following examples which are intended to illustrate, but not limit, the invention.

EXAMPLES AND COMPARISON EXAMPLES

Analysis of Ethoxylated $C_8/C_{10}$ Alcohols

Analysis of a sample of typical commercially available $C_8/C_{10}$ ethoxylated alcohols (Item 1) and of samples of two typical commercially available $C_8/C_{10}$ narrow range ethoxylated alcohols particularly suitable for this invention (Items 2 and 3) provides the results shown in Table 1.

TABLE 1

| Item No. | Weight in Item of Molecules with Number of Ethoxy Units per Molecule Equal to: | | | | | |
|---|---|---|---|---|---|---|
| | 0 | 1 | 2 | 3 | 4 | 5 |
| 1 | 32 | 28 | 26 | 13 | 1 | 0 |
| 2 | 9 | 12 | 24 | 29 | 20 | 6 |
| 3 | 17 | 29 | 35 | 17 | 2 | 0 |
| 4 | 13 | 13 | 14 | 25 | 20 | 4 |

The above data indicate that the narrow range ethoxylated alcohols have a higher percentage of molecules with mole amounts of ethoxy units at values of 2 and 3 and a significantly lower percentage of undesirable unethoxylated alcohols. These differences in percentages make the narrow range ethoxylated alcohols more desirable precursors for foaming agents.

Sulfating Narrow Range Ethoxylated Alcohols

Narrow range ethoxylated alcohols that are suitable starting materials for making the compositions of this invention may be sulfated using standard techniques well known to those skilled in the art. An example is provided below.

One mole of narrow range ethoxylated alcohol was placed in a glass lined reactor vessel and vacuum stripped of moisture so that less than 0.1% moisture remained. The reactor was then cooled to 25°–28° C. While maintaining the temperature at about 25°–30° C. and under a high vacuum, 1.0–1.1 mole of chlorosulfonic acid was added to the reactor vessel. The resultant hydrochloric acid formed was then removed by vacuum stripping until no more gas evolved, indicating reaction completion. The fluid contents of the reactor vessel were then removed and introduced into another vessel containing an effective amount of water, alcohol and alkali to neutralize the fluid to a neutral pH and convert it into a suitable foaming agent according to this invention.

Distribution of x and y Values in Formula II for Examples 1–2 ("Items 2–3") and Some Comparison Examples Table 2 shows the percentage of molecules with various values of the indices x and y from formula II in sulfates made from Items 1–3 shown in Table 1 (and identified with the same Item numbers in Tables 2–5) and in some commercially available foaming agents that serve as comparison examples. (Because of obligations under secrecy agreements between the applicants and the suppliers of these commercial products, the commercial names of the comparison example products are not being disclosed. Instead, the products are designated by letters below.) The percentages were determined by conventional gas chromatography-mass spectrometry (GC-MS). Percentages of molecules having 6 ethoxy units or more were not included in the table but were always small.

TABLE 2

| Foaming Agent Identification | Value of x in Formula II | Percent in Total Mixture of Molecules Conforming to Formula II with Values of y Equal to: | | | | | |
|---|---|---|---|---|---|---|---|
| | | 0 | 1 | 2 | 3 | 4 | 5 |
| Product A | 7 | 2.4 | 0.0 | 0.0 | 0.0 | 0.0 | 0.0 |
| | 9 | 13.3 | 14.4 | 17.9 | 15.6 | 8.6 | 2.2 |
| | 11 | 4.0 | 3.8 | 4.4 | 3.8 | 1.9 | 0.0 |
| (branched) | 11 | 3.2 | 1.6 | 1.5 | 1.2 | 0.0 | 0.0 |
| Totals | | 22.8 | 19.8 | 23.9 | 20.5 | 10.4 | 2.2 |
| Item 1 | 7 | 11.3 | 12.2 | 10.2 | 4.2 | 0.0 | 0.0 |
| | 9 | 20.0 | 16.0 | 15.4 | 8.4 | 1.3 | 0.0 |
| | 11 | 0.9 | 0.0 | 0.0 | 0.0 | 0.0 | 0.0 |
| Totals | | 32.2 | 28.2 | 25.6 | 12.6 | 1.3 | 0.0 |
| Product B | 7 | 1.0 | 0.7 | 0.8 | 0.4 | 0.0 | 0.0 |
| | 9 | 9.1 | 11.4 | 16.2 | 15.1 | 10.3 | 3.4 |
| | 11 | 4.9 | 1.4 | 1.6 | 1.4 | 0.7 | 0.0 |
| (Branched) | 11 | 4.9 | 4.5 | 3.3 | 0.0 | 0.0 | 0.0 |
| | 13 | 3.0 | 1.0 | 1.1 | 0.9 | 0.0 | 0.0 |
| Totals | | 22.9 | 19.0 | 23.0 | 17.8 | 11.1 | 3.4 |
| Product C | 5 | 0.0 | 0.8 | 0.0 | 0.0 | 0.0 | 0.0 |
| 0.0 | 7 | 8.2 | 10.4 | 9.1 | 6.7 | 4.1 | 1.5 |
| | 9 | 20.3 | 13.8 | 11.4 | 7.6 | 4.1 | 0.8 |
| | 11 | 0.7 | 0.0 | 0.0 | 0.0 | 0.0 | 0.0 |
| Totals | | 29.2 | 25.0 | 20.5 | 14.3 | 8.2 | 2.4 |
| Product D | 7 | 14.9 | 12.1 | 8.0 | 4.6 | 1.8 | 0.5 |
| | 9 | 25.2 | 15.5 | 10.3 | 4.7 | 1.7 | 0.0 |
| | 11 | 0.7 | 0.0 | 0.0 | 0.0 | 0.0 | 0.0 |
| Totals | | 40.8 | 27.6 | 18.3 | 9.3 | 3.6 | 0.5 |
| Product F | 7 | 4.7 | 8.3 | 9.4 | 7.9 | 3.9 | 1.1 |
| | 9 | 25.2 | 15.5 | 19.3 | 4.7 | 1.7 | 0.0 |
| | 11 | 0.7 | 0.0 | 0.0 | 0.0 | 0.0 | 0.0 |
| Totals | | 30.6 | 23.8 | 28.7 | 12.6 | 5.7 | 1.1 |
| Item 2 | 7 | 2.4 | 4.3 | 10.3 | 13.4 | 9.1 | 2.8 |
| | 9 | 6.6 | 7.2 | 13.6 | 15.6 | 10.9 | 4.0 |
| | 11 | 0.0 | 0.0 | 0.0 | 0.0 | 0.0 | 0.0 |
| Totals | | 9.0 | 11.5 | 23.8 | 28.9 | 20.0 | 6.0 |
| Item 3 | 7 | 4.6 | 10.9 | 13.6 | 6.1 | 0.8 | 0.0 |
| | 9 | 10.3 | 15.3 | 17.8 | 9.7 | 1.3 | 0.0 |
| | 11 | 2.3 | 2.7 | 3.1 | 1.4 | 0.0 | 0.0 |
| Totals | | 17.3 | 28.9 | 34.6 | 17.2 | 2.1 | 0.0 |

Notes to Table 2
The line in some of the groups preceded by (Branched) indicates material that does not conform strictly to the preferred Formula II; instead, two of the —CH$_2$— units prescribed by that formula were substituted by a —CH(CH$_3$)— unit. Molecules of this type, which are present in some of the Comparison Examples but not in the Examples according to the invention, are considered as part of "Total Mixture of Molecules Conforming to Formula II" for the purposes of computing the percentages in this Table. Where no line preceded by (Branched) appears in a group in the Table, the item contains less than 0.0% of any material with x = 13.

Some of the data contained in Table 2 are presented in a different form for more convenient comparison to Table 3.

TABLE 3

| Foaming Agent Identification | Percent in Total Mixture of Molecules Conforming to Formula II with Values of y = | | |
|---|---|---|---|
| | 0 | 1 | 2 or 3 |
| Product D | 40.8 | 27.6 | 27.6 |
| Item 1 | 32.2 | 28.1 | 38.2 |
| Product E | 30.6 | 23.8 | 41.3 |
| Product C | 29.2 | 25.0 | 34.7 |
| Product B | 22.9 | 19.0 | 40.8 |
| Product A | 22.8 | 19.8 | 44.3 |
| Item 3 | 17.3 | 28.9 | 52.7 |
| Item 2 | 9.0 | 11.5 | 52.7 |
| Item 4 | 13.1 | 13.2 | 38.2 |

As can be readily seen from the above data for Items 2 and 3, the compositions of the present invention comprise a greater percentage of desirable molecules having 2 or 3 alkoxy units per molecule and a lesser percentage of undesirable unethoxylated molecules. This combination yields desirable foaming characteristics. A preferred composition has an average of 2.2 ethoxy units per molecule. Some of the improved foaming characteristics are indicated by the tests and data set forth below.

Mixtures of the surfactants set forth in Table 3 with an alkyl sulfate can be prepared by simple mixing of an alkyl sulfate surfactant with an etherified and then sulfated fatty alcohol (which also contains unetherified molecular species). Such blends prepared at weight ratios of 85/15, 90/10, 95/5, and 99/1 of alkyl sulfate/surfactant of Table 3, respectively, will have the weight ratios of $y_0:y_{2,3}$ and $y_0:y_1$ set forth in Table 4.

TABLE 4

| | 85/15 | | 90/10 | | 95/5 | | 99/1 | |
|---|---|---|---|---|---|---|---|---|
| | $y_0:y_{2,3}$ | $y_0:y_1$ | $y_0:y_{2,3}$ | $y_0:y_1$ | $y_0:y_{2,3}$ | $y_0:y_1$ | $y_0:y_{2,3}$ | $y_0:y_1$ |
| D | 22.0 | 22.0 | 34.1 | 34.1 | 70.3 | 70.3 | 360 | 360 |
| 1 | 15.7 | 21.2 | 24.4 | 33.1 | 50.6 | 68.5 | 260 | 352 |
| E | 14.5 | 25.1 | 22.5 | 39.1 | 46.8 | 81.2 | 240 | 417 |
| C | 17.2 | 23.8 | 26.7 | 37.2 | 55.4 | 7.2 | 285 | 397 |
| B | 14.5 | 31.0 | 22.6 | 48.6 | 47.1 | 101 | 243 | 522 |
| A | 13.4 | 29.8 | 21.0 | 46.6 | 43.3 | 97.1 | 223 | 501 |
| 3 | 11.3 | 20.2 | 17.7 | 31.7 | 37.0 | 66.3 | 191 | 343 |
| 2 | 10.9 | 50.1 | 17.3 | 79.0 | 36.2 | 166 | 188 | 861 |
| 4 | 15.2 | 43.9 | 23.9 | 69.2 | 50.1 | 145 | 260 | 751 |

FOAMING CHARACTERISTIC TESTING

Laboratory scale experiments can be carried out to compare foaming characteristics of various foaming agent compositions.

TEST PROCEDURE

This procedure was used to compare the densities of slurries suitable for gypsum board manufacture. The equipment required for this test procedure included a Hobart Mixer, a Hamilton Beach mixer, and a CT-60 Cement Cube Mold, commercially available from Soiltest Inc., Pennsauken, N.J.

A slurry was prepared by combining 270 grams of distilled water with 1.8 grams (0.5% measured as solids on weight of stucco solids) of DILOFLO™ (available from Henkel Corporation, Ambler, Pa.) dispersant in the bowl of a Hobart mixer and adding to the resulting solution 360 grams of stucco, 0.5 grams of accelerator, and 1.35 grams of a starch-based bonding agent. The resulting mixture was allowed to soak for ten seconds. A foam was then separately prepared with a Hamilton Beach mixer by mixing 2.16 ml of a 2% active surfactant solution with 46.8 ml of deionized water on high speed for one minute. The foaming agent was then weighed into the Hobart mixer bowl and the slurry was mixed at high speed for 23 seconds.

A three cube CT-60 Cement Mold was then separately weighed. It should be noted that the mold is thinly coated with Potters TM 14A which facilitates the removal of a cube from its mold after hardening. The slurry was poured into the first cube. Using a spatula, the stucco was scraped in order to even its surface with the mold surface. The weight of the mold and stucco was then recorded.

The weighing process was repeated for the second and third cubes of the CT-60 Cement Mold and the weight of each was recorded. The weight of the three cubes was recorded as the wet pour weight and was used for comparison purposes as indicated in the following table. The cubes were allowed to harden at room temperature for approximately one hour and were then removed from their molds. Each cube was reweighed. The weight was recorded as the dry weight of the cubes. The cubes were then placed in an oven set at a temperature of 43° C. for about two days and allowed to dry to constant weight. The cubes were subsequently removed and allowed to cool. The cubes were reweighed and the weight of all three was determined. The weight was recorded as the after oven drying weight. The cubes were stored at room temperature and 50% relative humidity for 24 hours. Each cube was reweighed an additional time before being tested for compressive strength.

Table 5 summarizes the results of blends of an alkyl sulfate and Item 4 at the ratio of weight of active of alkyl sulfate/weight of active of Item 4 shown in Table 5, below.

TABLE 5

GYPSUM FOAM TEST

| FOAMING AGENT | WET POUR WT. (grams) | REMOVAL WT. (grams) | DRY WT. (grams) | COMPRESSIVE STRENGTH (psi) |
|---|---|---|---|---|
| Blend 95/5 | | | | |
| Run 1 | 156.40 | 153.30 | 94.70 | 539.00 |
| Run 2 | 164.30 | 159.90 | 98.70 | 543.30 |
| Run 3 | 167.70 | 164.90 | 102.10 | 520.30 |
| Run 4 | 157.20 | 155.00 | 95.00 | 528.00 |
| Run 5 | 166.00 | 161.40 | 98.90 | 570.80 |
| Run 6 | 168.10 | 167.00 | 102.80 | 581.50 |
| Blend 90/10 | | | | |
| Run 1 | 139.40 | 137.00 | 84.10 | — |
| Run 2 | 148.80 | 145.80 | 89.60 | 484.00 |
| Run 3 | 157.30 | 154.90 | 95.40 | 504.00 |
| Blend 85/15 | | | | |
| Run 1 | 136.60 | 134.60 | 82.40 | 285.40 |
| Run 2 | 143.00 | 139.90 | 85.70 | 359.80 |
| Run 3 | 146.80 | 144.60 | 88.90 | 397.40 |
| Run 4 | 135.70 | 132.60 | 81.20 | 292.90 |
| Run 5 | 141.80 | 137.50 | 84.10 | 330.00 |
| Run 6 | 145.50 | 143.60 | 88.10 | 374.30 |
| Blend 80/20 | | | | |
| Run 1 | 131.80 | 129.10 | 79.70 | 294.00 |
| Run 2 | 136.60 | 133.20 | 82.20 | — |
| Run 3 | 140.70 | 137.90 | 85.30 | 378.00 |
| Blend 100/0 | | | | |
| Run 1 | 182.90 | 177.40 | 111.50 | 871.00 |
| Run 2 | 186.50 | 181.10 | 113.70 | 931.00 |
| Run 3 | 187.50 | 183.10 | 115.10 | — |
| Blend 0/100 | | | | |
| Run 1 | 111.20 | 106.30 | 66.10 | 196.00 |
| Run 2 | 111.50 | 107.40 | 66.80 | 219.00 |
| Run 3 | 112.80 | 100.70 | 62.90 | — |

What is claimed is:

1. A composition of matter useful as a surfactant comprising a mixture of compounds, conforming to the formula II:

$$R(OCH_2CH(R'))_yOSO_3M \qquad (II)$$

where R is a fatty alkyl group, R' represents hydrogen or a lower alkyl group, M is selected from the group consisting of sodium and ammonium ions, wherein y is an integer, wherein the average value for y, for the compounds conforming to formula II, is from about 0.001 to 0.3, wherein said mixture of compounds comprises compounds having y equal to 0, compounds having y equal to 1, compounds having y equal to 2, compounds having y equal to 3, and compounds having y equal to 4, and wherein a weight ratio of the compounds having y equal to 0 to the sum of the weight of the compounds having y equal to 2 and the weight of the compounds having y equal to 3 is at least 12:1.

2. The composition as claimed in claim 1 wherein the weight ratio of the compounds having y equal to 0 to the sum of the weight of the compounds having y equal to 2 and the weight of the compounds having y equal to 3 is at least 21:1.

3. The composition as claimed in claim 1 wherein the weight ratio of the compounds having y equal to 0 to the sum of the weight of the compounds having y equal to 2 and the weight of the compounds having y equal to 3 is from about 25:1 to about 99:1.

4. The composition as claimed in claim 1 wherein the weight ratio of the compounds having y equal to 0 to the sum of the weight of the compounds having y equal to 2 and the weight of the compounds having y equal to 3 is from about 30:1 to about 60:1.

5. The composition as claimed in claim 1 wherein an average value for y for the compounds conforming to formula II is less than 0.4.

6. The composition as claimed in claim 1 wherein an average value for y for the compounds conforming to formula (II) is from about 0.001 to 0.3.

7. The composition as claimed in claim 1 wherein a weight ratio of a sum of the weight of the compounds having y equal to 2 and the weight of the compounds having y equal to 3 to the weight of the compounds having y equal to 1, is at least 2.1:1.

8. The composition as claimed in claim 1 wherein a weight ratio of the sum of the weight of the compounds having y equal to 2 and the weight of the compounds having y equal to 3 to the weight of the compounds having y equal to 1, is at least 2.3:1.

9. The composition as claimed in claim 1 wherein a weight ratio of the sum of the weight of the compounds having y equal to 2 and the weight the compounds having y equal to 3 to the weight of the compounds having y equal to 1, is from about 3.0:1 to about 6.0:1.

10. The composition as claimed in claim 1 wherein R is an alkyl group having from 5 to 22 carbon atoms.

11. The composition as claimed in claim 1 wherein R is $CH_3(CH_2)_x$— and x has an average value ranging from 5 to 11.

12. The composition as claimed in claim 11 wherein x has an average value which ranges from 7 to 9.

13. The composition as claimed in claim 11 wherein at least about 90% by weight of the composition consists of compounds having a value of x in the range from 7 to 9.

14. The composition as claimed in claim 1 wherein R' is hydrogen or a methyl group.

15. The composition as claimed in claim 1 wherein R' is hydrogen.

16. A foaming agent composition consisting essentially of a major amount, by weight, of the foaming composition of claim 1, a first minor amount, by weight, of a hydrotrope and a second minor amount, by weight, of water.

17. The composition as claimed in claim 16 further comprising a sequestering agent for divalent and higher valent metal ions.

18. A foaming agent composition consisting essentially of from about 40 to about 60% by weight of the foaming composition of claim 1, from about 5 to about 20% by weight of a hydrotrope selected from the group consisting of methanol, ethanol, isopropanol, ethylene glycol, propylene glycols, polyethylene and polypropylene glycols, monoalkyl ethers of ethylene glycol, alkyl polyglucosides, and mixtures thereof; and the balance water.

19. A foamed composition useful in the manufacture of gypsum board, said foamed gypsum composition comprising gypsum and a foamed composition useful as a surfactant comprising a mixture of compounds, conforming to the formula II:

$$R(OCH_2CH(R'))_yOSO_3M \qquad (II)$$

where R is a fatty alkyl group, R' represents hydrogen or a lower alkyl group, M is selected from the group consisting of sodium and ammonium ions, wherein y is an integer, wherein the average value for y, for the compounds conforming to formula II, is from about 0.001 to 0.3, wherein said mixture of compounds comprises compounds having y equal to 0, compounds having y equal to 1, compounds having y equal to 2, compounds having y equal to 3, and compounds having y equal to 4, and wherein a weight ratio of the compounds having y equal to 0 to the sum of the weight of the compounds having y equal to 2 and the weight of the compounds having y equal to 3 is at least 12:1.

20. The composition as claimed in claim 19 wherein the weight ratio of the compounds having y equal to 0 to the sum of the weight of the compounds having y equal to 2 and the weight of the compounds having y equal to 3 is at least 21:1.

21. The composition as claimed in claim 19 wherein the weight ratio of the compounds having y equal to 0 to the sum of the weight of the compounds having y equal to 2 and the weight of the compounds having y equal to 3 is from about 25:1 to about 99:1.

22. The composition as claimed in claim 19 wherein the weight ratio of compounds having y equal to 0 to the sum of the weight of the compounds having y equal to 2 and the weight of the compounds having y equal to 3 is from about 30:1 to about 60:1.

23. The composition as claimed in claim 19 wherein the average value for y, for the compounds conforming to formula II, is less than 0.4.

24. The composition as claimed in claim 19 wherein the average value for y, for the compounds conforming to formula II, is from about 0.001 to 0.3.

25. The composition as claimed in claim 19 wherein the weight ratio of the sum of the weight of the compounds having y equal to 2 and the weight of the compounds having y equal to 3 to the compounds having y equal to 1, is at least 2.1:1.

26. The composition as claimed in claim 19 wherein the weight ratio of the sum of the weight of the compounds having y equal to 2 and the weight of the compounds having y equal to 3 to the weight of the compounds having y equal to 1, is at least 2.3:1.

27. The composition as claimed in claim 19 wherein the weight ratio of the sum of the weight of the compounds having y equal to 2 and the weight of the compounds having y equal to 3 to the weight of the compounds having y equal to 1 is from about 3.0:1 to about 6.0:1.

28. The composition as claimed in claim 19 wherein R is an alkyl group having from 5 to 22 carbon atoms.

29. The composition as claimed in claim 19 wherein R is $CH_3(CH_2)_x—$ and x has an average value ranging from 5 to 11.

30. The composition as claimed in claim 29 wherein x has an average value which ranges from 7 to 9.

31. The composition as claimed in claim 29 wherein at least about 90% by weight of the composition consists of compounds having a value of x in the range from 7 to 9.

32. The composition as claimed in claim 19 wherein R' is hydrogen or a methyl group.

33. The composition as claimed in claim 19 wherein R' is hydrogen.

34. The composition as claimed in claim 19 wherein the weight ratio of the compounds having y equal to 0 to the sum of the weights of the compounds having y equal to 2 and the weight of the compounds having y equal to 3 is from about 30:1 to about 60:1 and the average value of y for the compounds conforming to formula II is less than 0.4.

* * * * *

UNITED STATES PATENT AND TRADEMARK OFFICE
CERTIFICATE OF CORRECTION

PATENT NO. : 5,714,001
DATED : February 3, 1998
INVENTOR(S) : Arpad Savoly et al.

It is certified that error appears in the above-indentified patent and that said Letters Patent is hereby corrected as shown below:

Claim 22, column 11, line 2, before "compounds", the word --the-- should be inserted.

Claim 34, column 12, line 43, after "60:1", a --,-- should be inserted.

Signed and Sealed this

Fourteenth Day of July, 1998

Attest:

BRUCE LEHMAN

Attesting Officer

Commissioner of Patents and Trademarks